(12) United States Patent
Albina et al.

(10) Patent No.: US 7,676,229 B2
(45) Date of Patent: Mar. 9, 2010

(54) CELLULAR-TO-VOIP CALL ESTABLISHMENT SYSTEMS, METHODS, DEVICES, AND COMPUTER SOFTWARE

(75) Inventors: Troy J. Albina, Odessa, FL (US); Carl Drueckhammer, Valrico, FL (US); Kenneth W. Hammer, Lutz, FL (US)

(73) Assignee: Syniverse Technologies, Inc., Tampa, FL (US)

( * ) Notice: Subject to any disclaimer, the term of this patent is extended or adjusted under 35 U.S.C. 154(b) by 661 days.

(21) Appl. No.: 11/513,529

(22) Filed: Aug. 31, 2006

(65) Prior Publication Data
US 2008/0056235 A1 Mar. 6, 2008

(51) Int. Cl.
H04W 72/00 (2009.01)
(52) U.S. Cl. .................................................... 455/445
(58) Field of Classification Search ................ 370/349, 370/401, 352; 379/908, 185, 114.13; 709/219; 455/422.1, 435.1, 445
See application file for complete search history.

(56) References Cited

U.S. PATENT DOCUMENTS

| | | | |
|---|---|---|---|
| 4,723,238 A | 2/1988 | Isreal et al. | |
| 4,901,340 A | 2/1990 | Parker et al. | |
| 6,381,325 B1 | 4/2002 | Hanson | |
| 6,385,195 B2 | 5/2002 | Sicher et al. | |
| 6,594,352 B1 | 7/2003 | Smith | |
| 6,611,516 B1 | 8/2003 | Pirkola et al. | |
| 6,671,364 B2 | 12/2003 | Rosera et al. | |
| 6,747,970 B1 | 6/2004 | Lamb et al. | |
| 6,751,207 B1 | 6/2004 | Lee et al. | |
| 6,931,007 B2 | 8/2005 | Jones | |
| 6,934,684 B2 | 8/2005 | Alpdemir et al. | |
| 6,996,414 B2 | 2/2006 | Vishwanathan et al. | |

(Continued)

FOREIGN PATENT DOCUMENTS

WO WO 2006/077587 A2 6/2006

OTHER PUBLICATIONS

A. Parthasarathy, "Push to talk over cellular (PoC) server," 2005 IEEE International Conference on Networking, Sensing and Control (IEEE Cat. No. 05EX967). IEEE. 2005, pp. 772-776. Piscataway, NJ, USA.

(Continued)

Primary Examiner—Diane Mizrahi
(74) Attorney, Agent, or Firm—Sentry Law Group

(57) ABSTRACT

Various embodiments of systems, methods, devices, and computer software for establishing a cellular-to-VoIP call are provided. One embodiment is a method for establishing a VoIP media session between an originating cellular telephone and a VoIP destination device. One such method comprises: receiving a first data message from an originating cellular telephone, the first data message comprising an identifier associated with a VoIP destination device; sending a second data message to the originating cellular telephone, the second data message comprising information identifying a temporary directory number (TDN) associated with the VoIP destination device; detecting an incoming voice call to the TDN from the originating cellular telephone; sending an invite message to the identifier associated with the VoIP destination device; sending a ringing indication to the originating cellular telephone; receiving an accept reply from the VoIP destination device; and answering the incoming voice call from the cellular telephone and establishing a VoIP media session between the originating cellular telephone and the VoIP destination device.

11 Claims, 12 Drawing Sheets

U.S. PATENT DOCUMENTS

| | | | |
|---|---|---|---|
| 2001/0015968 | A1 | 8/2001 | Sicher et al. |
| 2002/0035474 | A1 | 3/2002 | Alpdemir |
| 2002/0068551 | A1 | 6/2002 | Strunk et al. |
| 2002/0196923 | A1 | 12/2002 | Donnelly |
| 2003/0043974 | A1* | 3/2003 | Emerson, III ............ 379/88.13 |
| 2003/0125958 | A1 | 7/2003 | Alpdemir et al. |
| 2004/0006478 | A1 | 1/2004 | Alpdemir et al. |
| 2004/0066925 | A1 | 4/2004 | Rosera et al. |
| 2004/0132433 | A1 | 7/2004 | Stern et al. |
| 2004/0192340 | A1 | 9/2004 | Brem et al. |
| 2004/0234062 | A1 | 11/2004 | Jones |
| 2004/0240430 | A1 | 12/2004 | Lin et al. |
| 2005/0096024 | A1 | 5/2005 | Bicker et al. |
| 2005/0100153 | A1 | 5/2005 | Pines et al. |
| 2005/0117566 | A1 | 6/2005 | Davidson |
| 2005/0129069 | A1 | 6/2005 | Binder |
| 2005/0147049 | A1 | 7/2005 | Ganesan |
| 2005/0152343 | A1 | 7/2005 | Rajagopalan |
| 2005/0186960 | A1 | 8/2005 | Jiang |
| 2005/0232249 | A1 | 10/2005 | Mishra |
| 2005/0249216 | A1 | 11/2005 | Jones |
| 2006/0018441 | A1 | 1/2006 | Timmins et al. |
| 2006/0025140 | A1 | 2/2006 | Bales et al. |
| 2007/0025270 | A1* | 2/2007 | Sylvain ...................... 370/254 |
| 2007/0070948 | A1* | 3/2007 | Kezys et al. ................ 370/331 |
| 2007/0083408 | A1* | 4/2007 | Altberg et al. ................. 705/7 |
| 2007/0121848 | A1* | 5/2007 | Faber et al. ............ 379/114.13 |
| 2007/0206571 | A1* | 9/2007 | Silver ......................... 370/352 |

OTHER PUBLICATIONS

Lucent Technologies, "Making IMS simple, A guide to the services domain," 2005 Lucent Technologies, pp. 1-25.

Ericsson, "IMS-IP Multimedia Subsystem, The value of using the IMS architecture," Oct. 2004 White Paper, pp. 1-24.

Ajay Rajkumar, Peretz Feder, Steven Benno, and Tom Janiszewski, "Seamless SIP-Based VoIP in Disparate Wireless Systems and Networks," Bell Labs Technical Journal 9(1), 65-82 (2004) Lucent Technologies Inc. Published by Wiley Periodicals, Inc. Published online in Wiley InterScience (www.interscience.wiley.com). DOI: 10.1002/bltj.20005.

Peter Kim, Andras Balazs, Eddy Van Den Broek, Gerhard Kieselmann, Wolfgang Bohm, "IMS-based Push-to-Talk over GPRS/UMTS," 2005 IEEE Wireless Communications and Networking Conference (IEEE Cat. No. 05TH8794). IEEE. Part vol. 4, 2005, pp. 2472-2477 vol. 4. Piscataway, NJ, USA.

Arup Acharya, Stefan Berger, Chandra Narayanaswami, "Unleashing the Power of Wearable Devices in a SIP Infrastructure," Proceedings, Third IEEE International Conference on Pervasive Computing and Communications. PerCom 2005. IEEE Comput. Soc. 2005, pp. 159-168. Los Alamitos, CA, USA.

M. Garcia-Martin, "A Session Initiation Protocol (SIP) Event Package and Data Format for Various Settings in Support for the Push-to-talk Over Cellular (PoC) Service," SIPPING Working Group, Sep. 27, 2005, pp. 1-21, http://rfc.netvolante.jp/internet-drafts/draft-garcia-sipping-poc-isb-am-04.txt.

Bruce Meyerson, "Skype, Boingo, Samsung, LG Nudge Combination of Wirelss and VoIP Calling Forward," TechnologyReview.com, Jul. 12, 2005, http://cache.technologyreview.com/articles/05/07/ap/ap_071205.0.asp.

John Marrin, "Review: Six Phones for VoIP On The Go," InformationWeek, MobilePipeline, Sep. 29, 2005, pp. 1-4, http://informationweek.mobilepipeline.com/171201988.

Texas Instruments Incorporated, Technology for Innovators, System Block Diagrams, Cell Phone, 1 page, http://focus.ti.com/vf/docs/blockdiagram.tsp?family=vf&blockDiagramId=2007.

Texas Instruments Incorporated, Technology for Innovators, System Block Diagrams, Wireless IP Phone, 2 pages, http://focus.ti.com/vf/docs/blockdiagram.tsp?family=vf&blockDiagramId=2008.

Mark A. Miller, "Understanding SIP—Part I: History and Architecture," May 17, 2005, VoIP Planet Newsletter, www.voipplanet.com.

Mark A. Miller, "Understanding SIP—Part II: Protocol Capabilities," May 24, 2005, VoIP Planet Newsletter, www.voipplanet.com.

Cisco Systems, Inc., "Overview of the Session Initiation Protocol," 7 pages, Sep. 28, 2002.

Salman A. Baset and Henning Schulzrinne, "An Analysis of the Skype Peer-to-Peer Internet Telephony Protocol," Sep. 15, 2004, 12 pages.

John D. Ramsdell, "Simple Instant Messaging and Presence Protocol, Version 2.5" The MITRE Corporation, Sep. 28, 2004, 24 Pages.

IETF Simple Specifications Support Presence-Based IM, Video, and Voice, Cover Pages hosted by OASIS, Feb. 17, 2004, pp. 1-39, http://xml.coverpages.org/ni2004-02-17-a.html.

M. Day, S. Aggarwal, G. Mohr, J. Vincent, Into Networks, Feb. 2000, "Instant Messaging/Presence Protocol Requirements," pp. 1-26.

\* cited by examiner

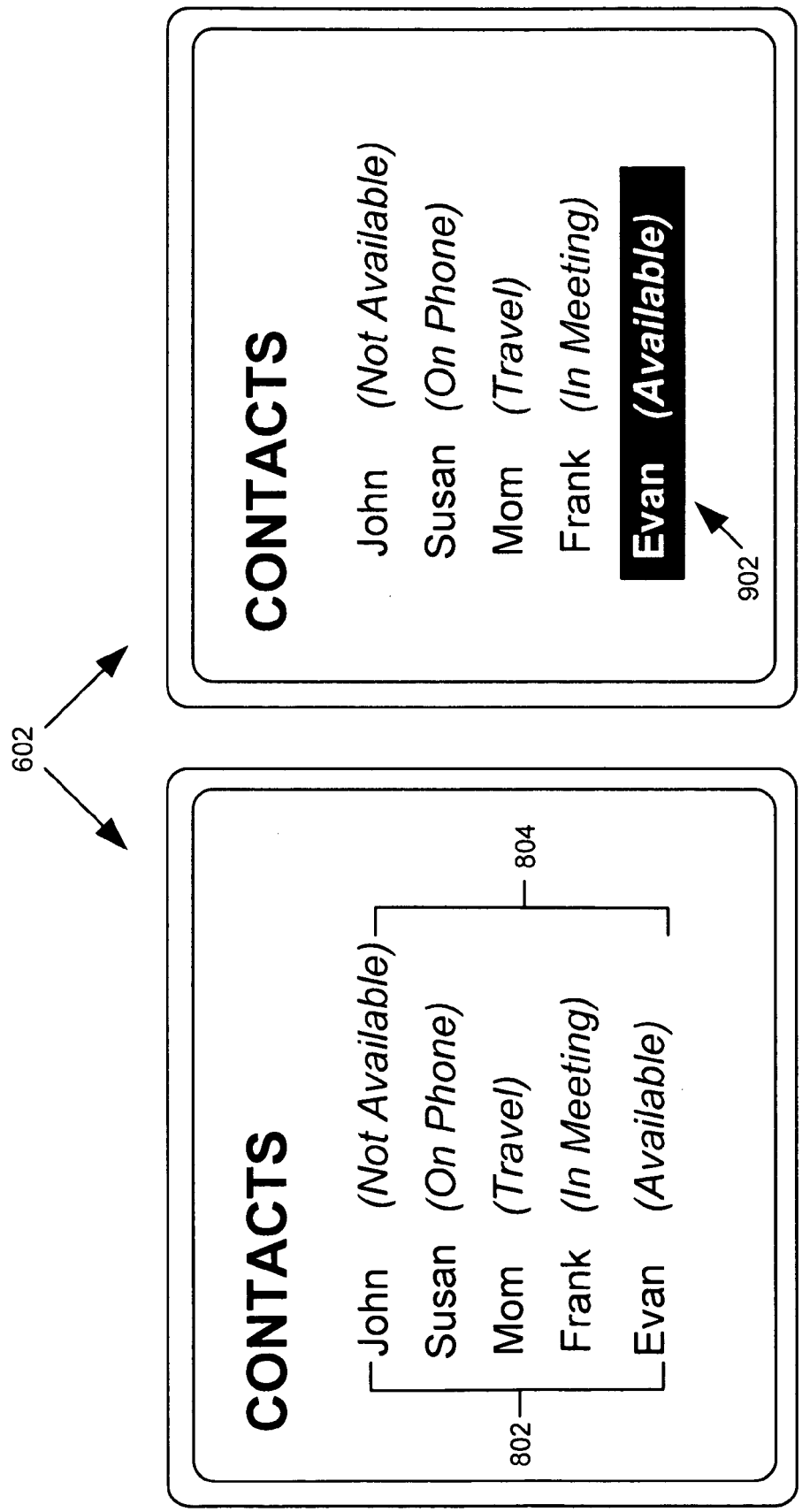

CELLULAR-TO-VOIP CALL ESTABLISHMENT SYSTEMS, METHODS, DEVICES, AND COMPUTER SOFTWARE

BACKGROUND

The telecommunication industry is replacing old business models dictated by the public switched telephone network (PSTN) with Internet technologies, next generation networks, and new interconnect business models. Examples of this shift include the rapid deployment of voice over Internet protocol (VoIP) services, and the migration toward Internet protocol multimedia subsystems (IMS). In general, IMS services are implemented using a blended architecture of Internet technologies and wireless network capabilities to enable creation of new services within and across different wireless and wireline networks.

Currently, there are a number of telecommunication systems, methods, and services which integrate cellular and VoIP services. For example, U.S. Patent Application Nos. 2004/0240430, 2005/0096024, 2005/0129069, 2005/0117566, 2005/0186960, 2005/0147049, 2005/0152343, 2001/0015968 and U.S. Pat. Nos. 6,385,195 and 6,611,516 (each of which are hereby incorporated by reference in their entirety) disclose systems for switching between a cellular service and a VoIP service. Other known cellular-to-VoIP systems (e.g., U.S. Patent Application No. 2004/0240430, which is hereby incorporated by reference in its entirety) employ a PSTN-to-VoIP gateway which interfaces with the cellular telephone via a cellular wireless network and interfaces with the VoIP destination device via a VoIP network. The PSTN-to-VoIP gateway exchanges messages, call signaling, and audio media with the cellular telephone and the VoIP destination device to enable the cellular telephone to roam from the cellular wireless network to the VoIP network. U.S. Patent Application Nos. 2005/0096024 2005/0129069, 2005/0117566, 2005/0186960, 2005/0147049, 2005/0152343, 2001/0015968 and U.S. Pat. Nos. 6,385,195 and 6,611,516 (each of which are hereby incorporated by reference in their entirety) disclose additional telecommunication systems and methods which employ a PSTN-to-VoIP gateway for transitioning between a cellular service and VoIP service.

There are various existing commercial solutions for establishing a voice session from a cellular telephone to a VoIP destination device over the PSTN. One such solution uses a telephone number which is permanently assigned to a VoIP destination device. A cellular service subscriber enters the telephone phone number assigned to the VoIP destination device into their cellular telephone. The cellular telephone originates a voice call to the entered telephone number, which terminates at a PSTN-to-VoIP gateway. The gateway detects the called telephone number for the incoming call and sends an SIP INVITE message to the SIP URI permanently assigned to that telephone number. The VoIP destination device sends a SIP "ringing" reply to the gateway. The gateway sends a "ringing" indication to the cellular telephone. The VoIP destination device sends a SIP "success" reply to the gateway, if the session invitation is accepted (i.e., the "call" is answered). The gateway "answers" the incoming call from the cellular telephone and bridges the PSTN circuit to a VoIP media session with the VoIP destination device.

Another existing commercial solution, referred to as the iSkoot™ service, establishes a voice session between a cellular telephone and a VoIP destination device using the following process. The cellular telephone sends a text message or an e-mail (containing the cellular telephone number and the VoIP destination) to a PSTN-to-VoIP gateway. The PSTN-to-VoIP gateway originates a PSTN call to the cellular telephone number. The cellular telephone answers the incoming call from the PSTN-to-VoIP gateway. The PSTN-to-VoIP gateway sends a SIP INVITE message to VoIP destination. If the VoIP destination device is available and session invitation is accepted (i.e., the call is answered), a SIP "success" reply is sent to the PSTN-to-VoIP gateway. Then the PSTN-to-VoIP gateway bridges the PSTN call to the cellular telephone with the VoIP media session to the VoIP destination device.

Another commercial solution offered by Skype implements a peer-to-peer internet telephony software application. The software application enables peer-to-peer or computer-to-computer VoIP calls. The Skype™ service also offers a hosted, fee-based service, referred to as SkypeOut™, which allows computer users to initiate calls to non-computer-based landline or cellular telephones from a desktop application. Another hosted, fee-based service, SkypeIn™, allows computer users to receive incoming calls from non-computer-based landline or cellular telephones on their computer.

Another solution currently provided by EQO Communications (referred to as EQO Mobile Internet Phone Service for Skype™) enables mobile phone users to initiate VoIP calls from their mobile phone. The EQO software application on the mobile phone enables users to select Skype™ users from a buddy list. After the user selects the Skype destination, the software application sends an SMS to a personal computer configured with the Skype software. The PC initiates a Skype session to the VoIP destination. The PC calls the originating mobile phone number, and then the PC bridges the call to the VoIP destination.

SUMMARY

Various embodiments of systems, methods, devices, and computer software for establishing a cellular-to-VoIP call are provided. One embodiment comprises a communication system for establishing a VoIP media session between an originating cellular telephone and a VoIP destination device, the communication system comprising: an application server configured to receive a first data message from an originating cellular telephone via the mobile data network, the first data message comprising information associated with a VoIP destination device, and further configured to send a second data message to the originating cellular telephone, the second data message comprising a temporary directory number (TDN) associated with the VoIP destination device; and a media gateway which interfaces with a circuit switched network and an IP network, the media gateway configured to receive an incoming voice call to the TDN from the originating cellular telephone, and further configured to establish a VoIP media session between the originating cellular telephone and the VoIP destination device.

Another embodiment comprises a method for establishing a session between an originating mobile communication device and a VoIP destination device. One such method comprises: receiving a first data message from an originating mobile communication device, the first data message comprising information identifying a VoIP destination device; sending a second data message to the originating mobile communication device, the second data message comprising information identifying a temporary directory number (TDN) associated with the VoIP destination device; receiving a voice call to the TDN from the originating mobile communication device; and establishing a session between the originating mobile communication device and the VoIP destination device.

Yet another embodiment comprises an application server associated with a PSTN-to-VoIP gateway for facilitating a VoIP media session between an originating cellular telephone and a VoIP destination device. One such application server comprises: logic configured to receive a first data message sent by an originating cellular telephone, the first data message comprising an identifier associated with a VoIP destination device; logic configured to send a second data message to the originating cellular telephone, the second data message comprising a temporary directory number (TDN) associated with the VoIP destination device which terminates at a media gateway; logic configured to receive a first session invite from the media gateway, in response to the media gateway detecting an incoming voice call to the TDN from the originating cellular telephone; logic configured to retrieve the identifier associated with the VoIP destination device; and logic configured to send a second session invite containing the identifier to the media gateway.

A further embodiment comprises a media gateway for establishing a VoIP media session between an originating cellular telephone and a VoIP destination device. One such media gateway comprises: a first interface device configured to communicate with a public switched telephone network (PSTN); a second interface device configured to communicate with an IP network; logic configured to detect an incoming voice call to a temporary directory number (TDN), via the first interface device, from an originating cellular telephone; logic configured to send, via the second interface device, a first invite message containing the TDN to an application server; logic configured to receive, via the second interface device, a second invite message from the application server which contains an identifier for a VoIP destination device associated with the TDN; logic configured to send, via the second interface device, a third invite message to the VoIP destination device; logic configured to send, via the first interface device, a ringing indication to the originating cellular telephone; logic configured to receive, via the second interface device, an accept reply from the VoIP destination device; logic configured to answer the incoming voice call from the cellular telephone; and logic configured to establish a VoIP media session between the originating cellular telephone and the VoIP destination device.

Another embodiment is a mobile communication device comprising: a user interface for enabling a user to select a VoIP destination device with which a VoIP media session is to be established; a wireless transceiver for communicating with a cellular network; and a cellular-to-VoIP call establishment module for facilitating the establishment of the VoIP media session between the mobile communication device and the VoIP destination device, the cellular-to-VoIP call establishment module comprising: logic configured to send a first data message via the cellular network, the first data message comprising an identifier associated with the VoIP destination device; logic configured to receive a second data message via the cellular network, the second data message comprising a temporary directory number (TDN) associated with the VoIP destination device; logic configured to initiate a voice call via the cellular network to the TDN; and logic configured to terminate the voice call and join the VoIP media session with the VoIP destination device.

BRIEF DESCRIPTION OF THE DRAWINGS

Other aspects, advantages and novel features of the invention will become more apparent from the following detailed description of exemplary embodiments of the invention when considered in conjunction with the following drawings.

FIG. 8 is a screen shot of an embodiment of a presence-enabled user interface for enabling a user to initiate a cellular-to-VoIP call.

FIG. 9 illustrates the user interface of FIG. 8 with a particular VoIP destination selected by the user.

DETAILED DESCRIPTION

This disclosure relates to various embodiments of systems, methods, devices, and computer software for establishing a session between an originating mobile communication device and a VoIP destination device are provided.

Figure 1:
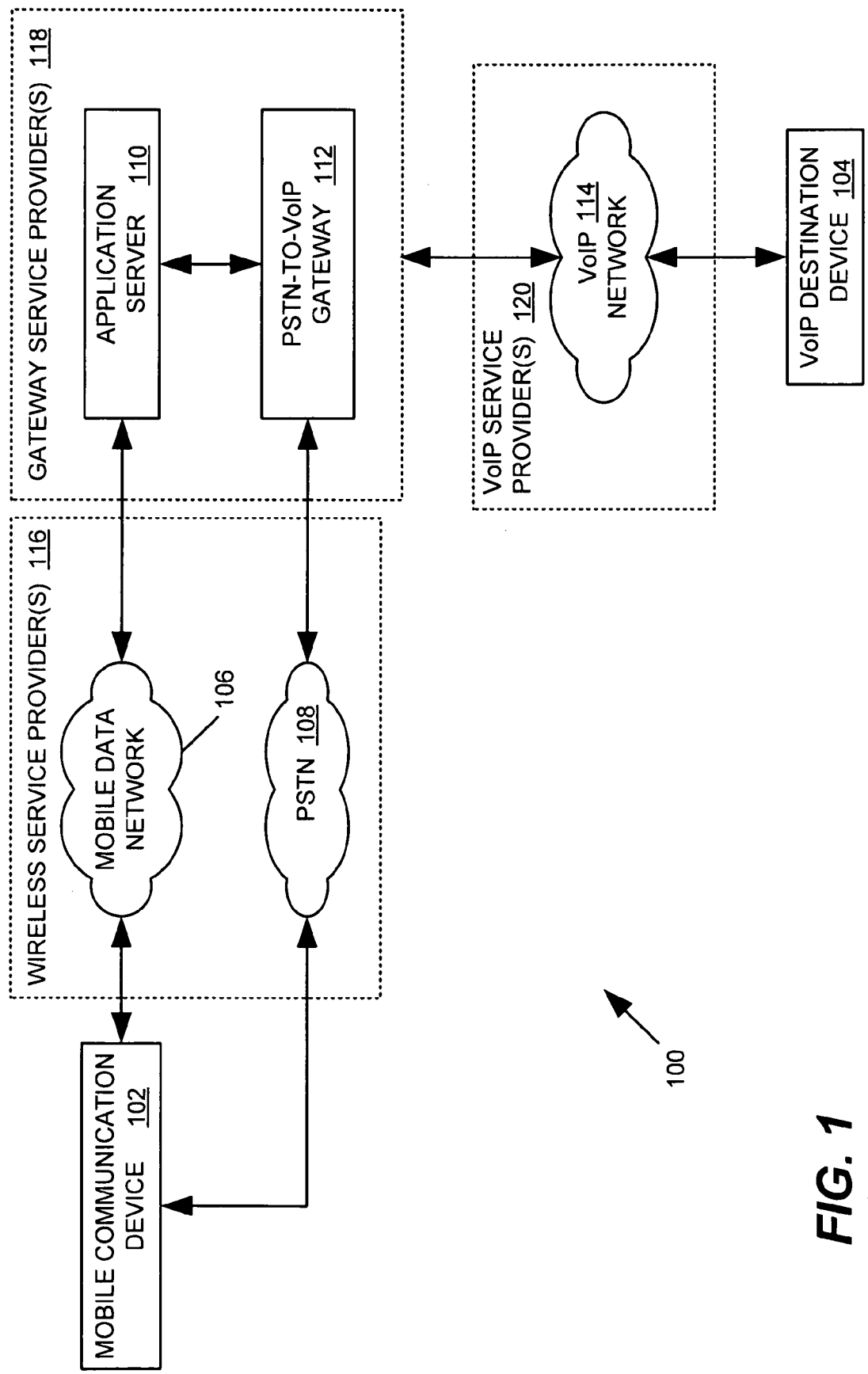
FIG. 1 is a block diagram of an embodiment of a communication system for establishing a session between an originating mobile communication device and a VoIP destination device.

FIG. 1 illustrates an embodiment of a communication system 100 for enabling a mobile communication device 102 (e.g., a cellular telephone or other wireless device) to initiate and establish communication with a VoIP destination device 104. Communication system 100 provides the communication infrastructure for implementing unique cellular-to-VoIP call establishment processes. As the name suggests, the call establishment process is from the cellular or wireless end (mobile communication device 102) to the VoIP end (VoIP destination device 104). In other words, the cellular-to-VoIP call establishment processes enable the user of a cellular or wireless telephone (or other mobile communication device) to place a call to a VoIP destination device.

As illustrated in the embodiment of FIG. 1, the cellular-to-VoIP call establishment process occurs across various types of networks and/or service providers. In this embodiment of FIG. 1, communication system 100 employs a mobile data network 106, a public switched telephone network (PSTN) 108, an application server 110, a gateway (e.g., PSTN-to-VoIP gateway 112), and a VoIP network 114.

Mobile data network 102 may comprise, for example, the mobile device accessible IP networks associated with the air interface type. In one embodiment, mobile data network 102 may comprise a GSM network and may support, for example, GPRS (General Packet Radio Service). In other embodiments, mobile data network 102 may comprise a CDMA network which supports the 1xRTT (single carrier (1x) radio transmission technology), a 3G wireless technology based on the CDMA platform. In further embodiments, mobile data network 102 may support 1xEVDO (single carrier (1x) Evolution Data Optimized). One of ordinary skill in the art will appreciate that any and all future evolutions of these networks (e.g., IMS (IP Multimedia System) and MMD (MultiMedia Domain)), as well as other suitable networks may be implemented, by which the mobile device accesses via mobile data network 102 using, for example, Internet Protocol (IP). It should be further appreciated that mobile data network 102 and/or PSTN 108 may be provided by one or more wireless service providers 116 (and/or other carriers).

VoIP network 114 may comprise any network that transports VoIP traffic, including but not limited to, SIP and RTP protocols. These networks typically have subscribers associated with them or may be transport networks only. The subscribers associated with them are typically the destination or origination of voice calls associated with this service.

Application server 110 and PSTN-to-VoIP gateway 112 may comprise VoIP and other protocol based services to those subscribers transiting the Gateway Service Provider network. Translation, transform, number management, routing and proxy functions are a few examples of services that may be provided. PSTN-to-VoIP gateway 112 may comprise the function of transform between traditional telephony protocols (e.g., ISDN User Part (ISUP), Telephone User Part (TUP), etc.) to VoIP protocols (e.g., SIP, RTP, etc.).

Application server 110 and PSTN-to-VoIP gateway 112 may be provided by one or more so-called gateway service providers 118 (e.g., an IP network provider, an IP exchange service provider). In alternative embodiments, application server 110 and/or PSTN-to-VoIP gateway 112 may be provided in conjunction with a wireless service provider 116 or a VoIP service provider 120.

Having generally described the supporting infrastructure of communication system 100, the operation of various embodiments of the cellular-to-VoIP call establishment process will be described. In the embodiment illustrated in FIG. 2, the cellular-to-VoIP call establishment process begins, at reference A, with mobile communication device 102 providing a data message to mobile data network 106, which is delivered to application server 110. While the data message is initially carried via mobile data network 106, it should be appreciated that the data message may be routed to other communication networks (wireless or wired) before arriving at application server 110. The data message from mobile communication device 102 comprises information associated with VoIP destination device 104. The data message may include a unique identifier or other information sufficient to identify VoIP destination device 104. At reference B, application server 110 provides a reply data message to mobile data network 106, which is delivered back to mobile communication device 102. The reply data message comprises a temporary directory number (TDN) which application server 110 associates with VoIP destination device 104. In this regard, application server 110 maintains a logical association between the TDN and the unique identifier for VoIP destination device 104. At reference C, mobile communication device 102 initiates a voice call (via PSTN 108) to the TDN which terminates at PSTN-to-VoIP gateway 112. At reference D, PSTN-to-VoIP gateway 112 detects the incoming call to the TDN and, in response, sends a query to application server 110 requesting the unique identifier associated with the TDN. At reference E, application server 110 sends an invite message to VoIP destination device 104. At reference F, VoIP destination device 104 sends an accept reply message to PSTN-to-VoIP gateway 112. With knowledge that VoIP destination device 104 is available, at reference H, PSTN-to-VoIP gateway 112 answers the incoming call from mobile communication device 102. Now, with open connections with both mobile communication device 102 and VoIP destination device 104, at reference I, PSTN-to-VoIP gateway 102 establishes a VoIP media session. As described below in more detail, the PSTN-to-VoIP gateway 112 may establish the VoIP media session (or other type of call or session) by bridging the voice call with mobile communication device 102 to the session with VoIP destination device 104.

Figure 2:
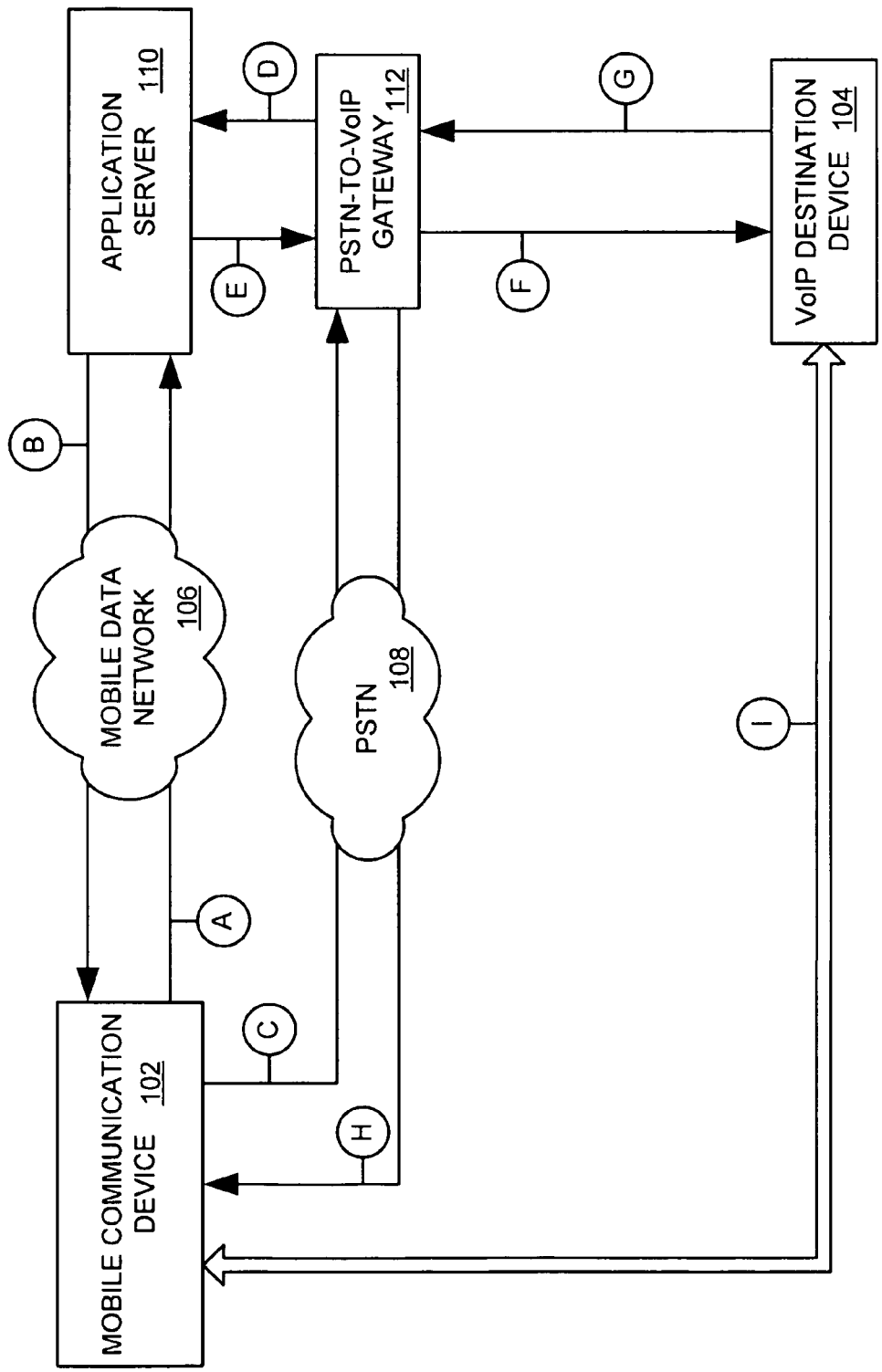
FIG. 2 is a flow diagram illustrating an embodiment of method for establishing a session between the originating mobile device and VoIP destination device of FIG. 1.

The cellular-to-VoIP call establishment process is implemented via logic (e.g., hardware, processor-implemented software, firmware, or any combination thereof) distributed across the various devices in communication system 100. In the embodiment of FIG. 2, the logic embodying the cellular-to-VoIP call establishment process is distributed across, for example, mobile communication device 102, application server 110, PSTN-to-VoIP gateway 112, VoIP destination device 104. It should be appreciated, however, that certain aspects of the logic may be implemented by other suitable devices in mobile data network 106, PSTN 108, VoIP network 114, or other associated networks. Furthermore, one ordinary skill in the art will appreciate that communication system 100 may employ other technologies, devices, software, processes, protocols, etc., which are known in the art (or developed in the future).

It should be appreciated that any process or logical descriptions of the cellular-to-VoIP call establishment process may represent modules, segments, or portions of code which include one or more executable instructions for implementing specific logical functions, steps, or acts in a process. It should be further appreciated that any logical functions may be executed out of order from that shown or discussed, including substantially concurrently or in reverse order, depending on the functionality involved, as would be understood by those reasonably skilled in the art.

One of ordinary skill in the art will further appreciate that the cellular-to-VoIP call establishment process may be implemented using any communication protocol, computer language, etc. and may embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the logic embodying the cellular-to-VoIP call establishment process for use by or in connection with the instruction execution system, apparatus, or device. The computer-readable medium may be, for example, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), a portable compact disc read-only memory (CDROM) (optical), and a communication signal containing the logic. Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 3:
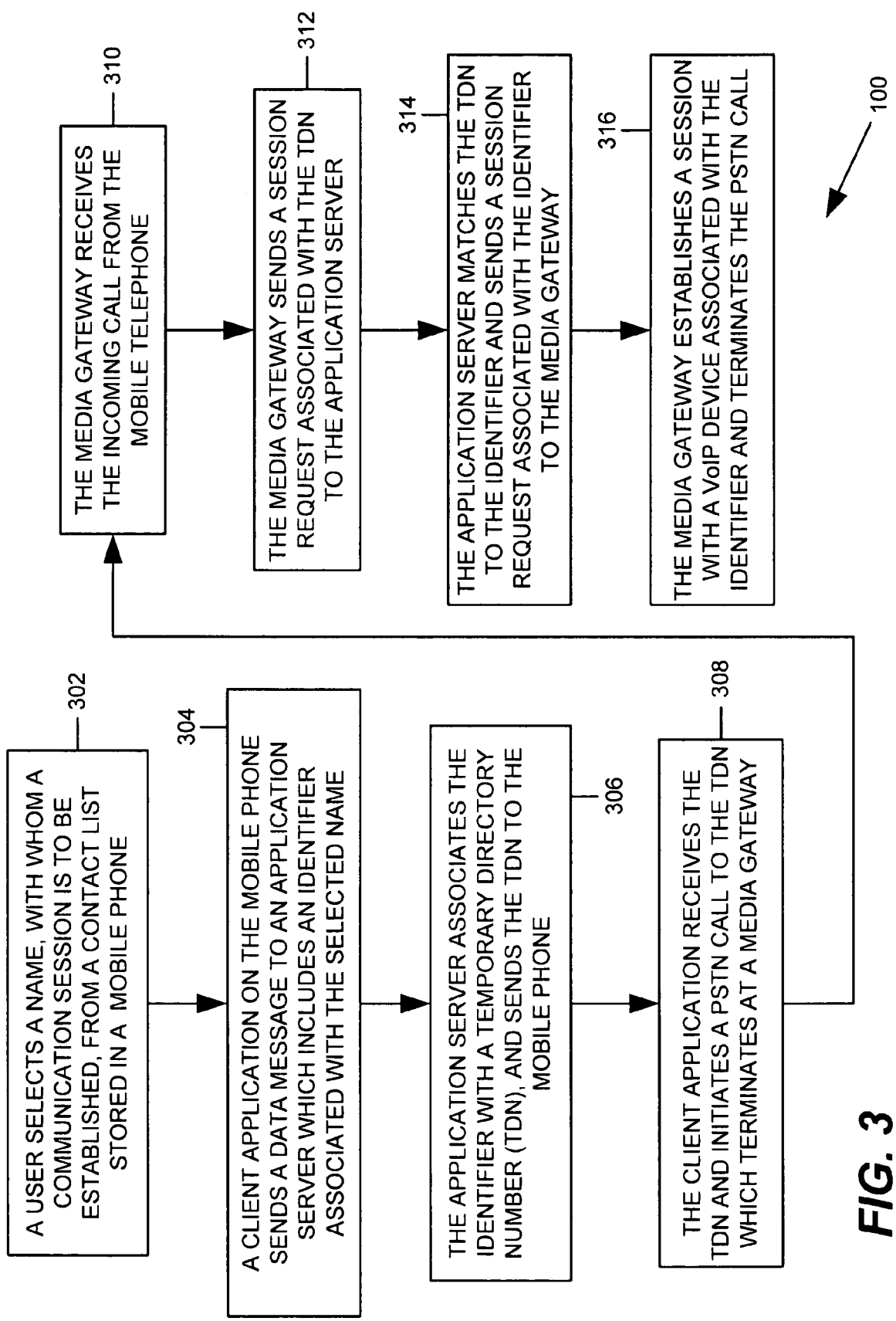
FIG. 3 is an operational flow chart illustrating another embodiment for establishing a session between the originating mobile device and the VoIP destination device of FIG. 1.

As mentioned above, the logic or functionality of the cellular-to-VoIP call establishment process is distributed across components of communication system 100. FIG. 3 illustrates, from the perspective of communication system 100, an embodiment of a cellular-to-VoIP call establishment process. At block 302, a user of mobile communication device 102 (e.g., a cellphone user or subscriber) selects a name from a stored contact list, with whom a communication session is to be established. From the user's perspective, the name need not represent a VoIP destination. Preferably, the user merely specifies a name from the contact list, and a client application on mobile communication device 102 recognizes the name as a VoIP destination. In this regard, the user need not be concerned with whether the "name" represents a VoIP subscriber, a wireless number, or a landline number. At block 304, the client application determines that the "name" represents a VoIP subscriber, and then sends a data message to application server 110. The data message identifies the VoIP destination with whom the user wants to establish a session.

At block 306, application server 110 receives the data message from the client application and associates the identifier with a temporary directory number (TDN). The TDN may be predefined to terminate at a media gateway affiliated with application server 110 (e.g., PSTN-to-VoIP gateway 112—FIGS. 1 & 2). Application server 110 sends the TDN to mobile communication device 102. At block 308, the client application receives the TDN and initiates a PSTN call to the TDN. At block 310, the media gateway receives or detects the incoming call from mobile communication device 102. At block 312, the media gateway sends a request to application server 110. The media gateway may provide information associated with the TDN to application server 110. Application server 110 receives the TDN, matches it to the corresponding identifier associated with the VoIP destination, and returns the identifier to the media gateway (block 314). At block 316, the media gateway establishes a session between mobile communication device 102 and VoIP destination device 104.

Figure 4:
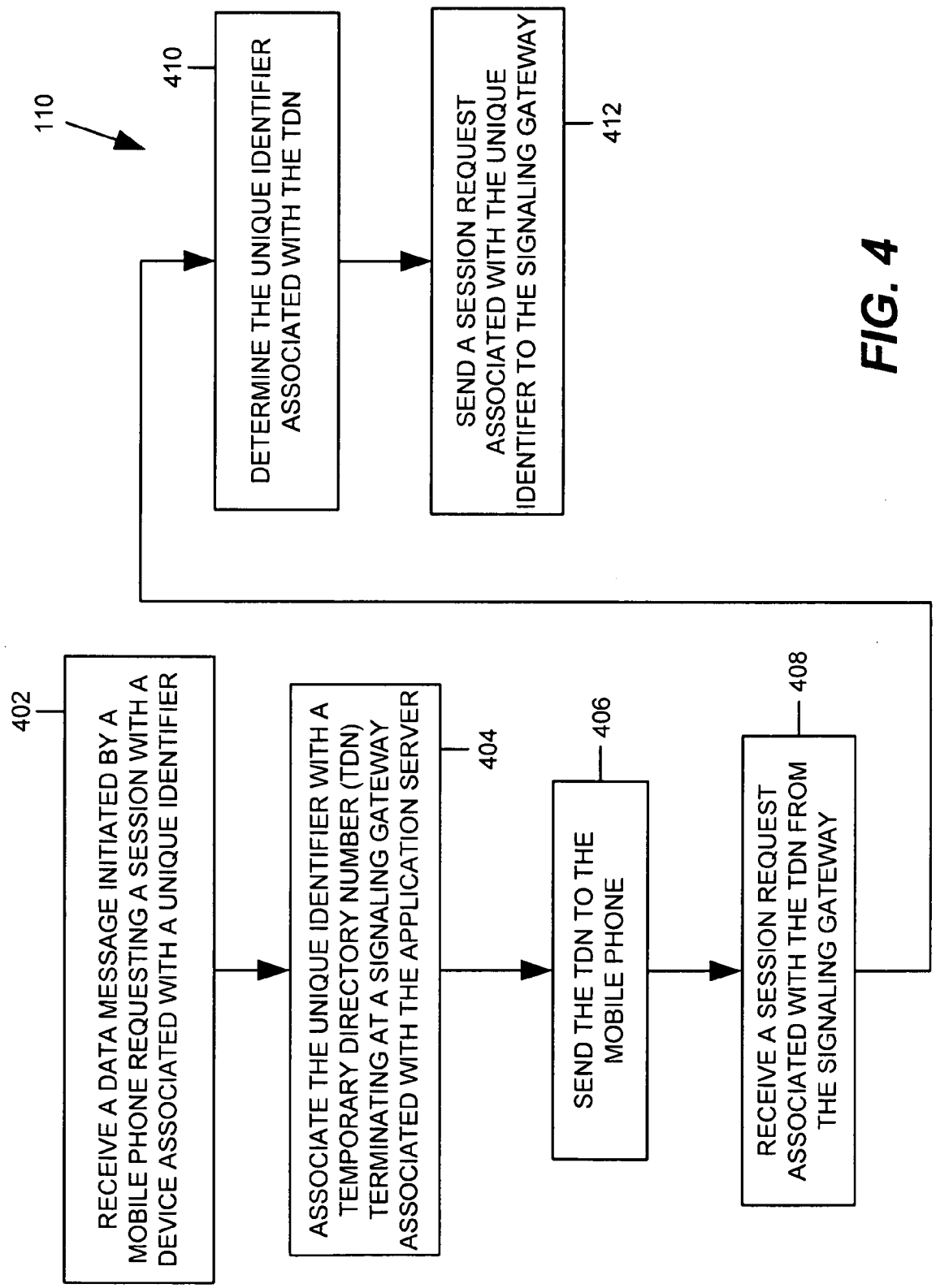
FIG. 4 is a flow chart illustrating the architecture, operation, and/or functionality of an embodiment of the application server of FIG. 1 for facilitating the establishment of the session between the originating mobile communication device and the VoIP destination device.

Having described several embodiments of the cellular-to-VoIP call establishment process from the perspective of communication system 100, various aspects of the cellular-to-VoIP call establishment process will be described from the perspective of certain system components. FIG. 4 illustrates aspects of the cellular-to-VoIP call establishment process from the perspective of application server 110. In this regard, FIG. 4 illustrates the architecture, operation, and/or functionality of an embodiment of application server 110, as well as a particular method for facilitating the cellular-to-VoIP call establishment process. At block 402, application server 110 receives the data message initiated by mobile communication device 102, which may include a unique identifier associated with VoIP destination device 104. At block 404, application server 110 associates the unique identifier with a TDN that terminates at a signaling gateway or a media gateway. Application server may bind the TDN, the unique identifier, and/or information related to mobile communication device 102. At block 406, application server 110 sends the TDN to mobile communication device 102. At block 408, application server 110 receives a session request (e.g., from an affiliated media gateway). The session request includes information identifying the TDN. At block 410, application server 110 determines the unique identifier which corresponds to the TDN. At block 412, application server 110 sends a session request to the media gateway which includes the unique identifier associated with VoIP destination device 104.

Figure 5:
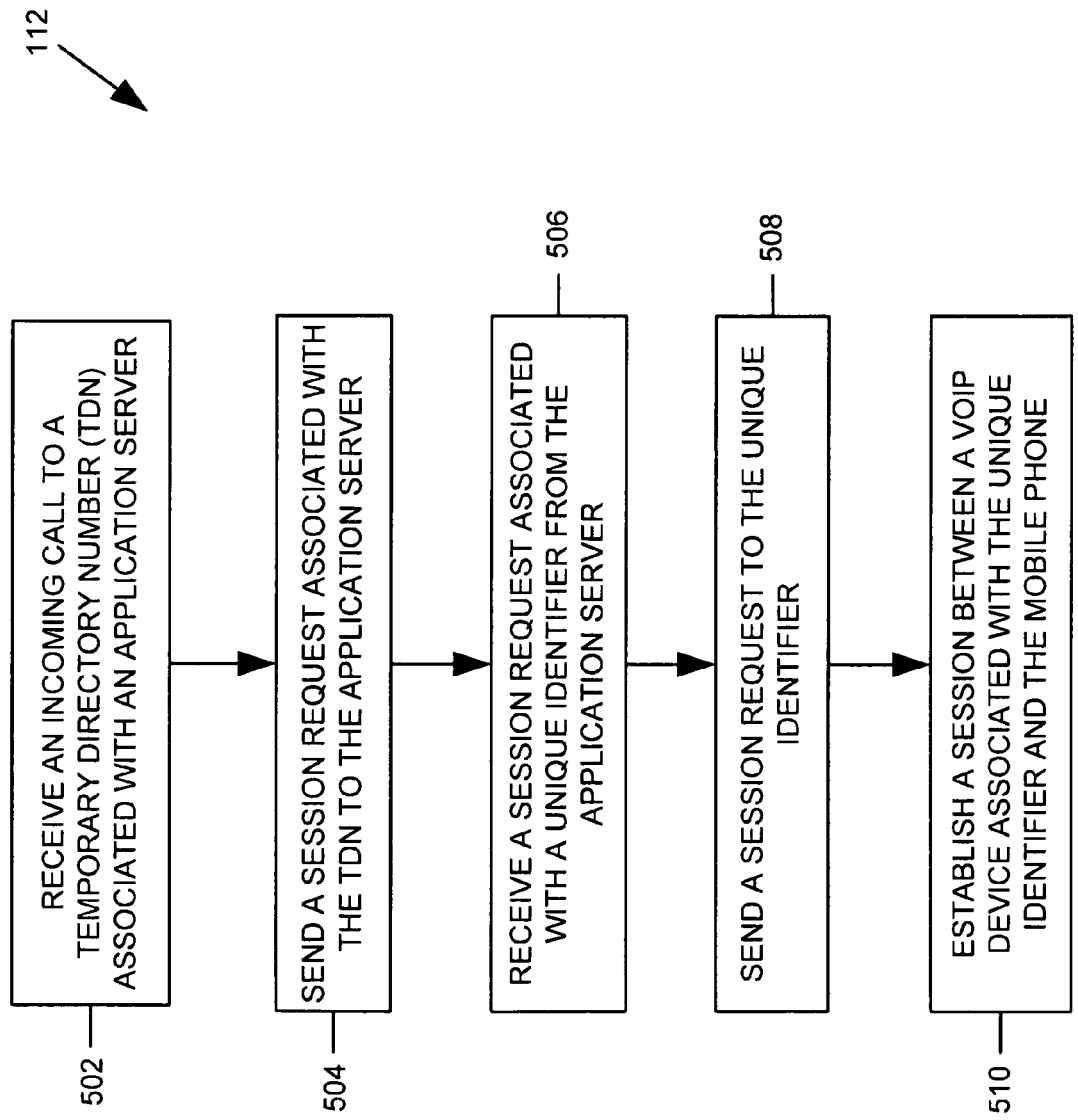
FIG. 5 is a flow chart illustrating the architecture, operation, and/or functionality of an embodiment of the PSTN-to-VoIP gateway of FIG. 1 for facilitating the establishment of the session between the originating mobile communication device and the VoIP destination device.

FIG. 5 illustrates various aspects of the cellular-to-VoIP call establishment process from the perspective of the media gateway (e.g., PSTN-to-VoIP gateway 112) associated with application server 110. It should be appreciated that the process illustrated in FIG. 5 may represent the architecture, operation, and/or functionality of an embodiment of the media gateway, as well as the general operation of an accompanying method for facilitating the cellular-to-VoIP call establishment process. At block 502, the media gateway receives an incoming call from mobile communication device 102. The incoming call is to a temporary directory number (TDN) assigned by application server 110. As mentioned above, application server 110 maintains a binding between the TDN and the associated VoIP destination selected by mobile communication device 102. The media gateway determines the TDN and, at block 504, sends a request to application server 110. The request comprises information sufficient for application server 110 to identify the TDN and determine the associated VoIP destination. At block 506, the media gateway receives a reply from application server 110 which identifies the VoIP destination device. At block 508, the media gateway sends a session request to the VoIP destination identified by application server 110. At block 510, the media gateway establishes the session between the originating mobile communication device 102 and the terminating VoIP destination device 104.

Figure 6:
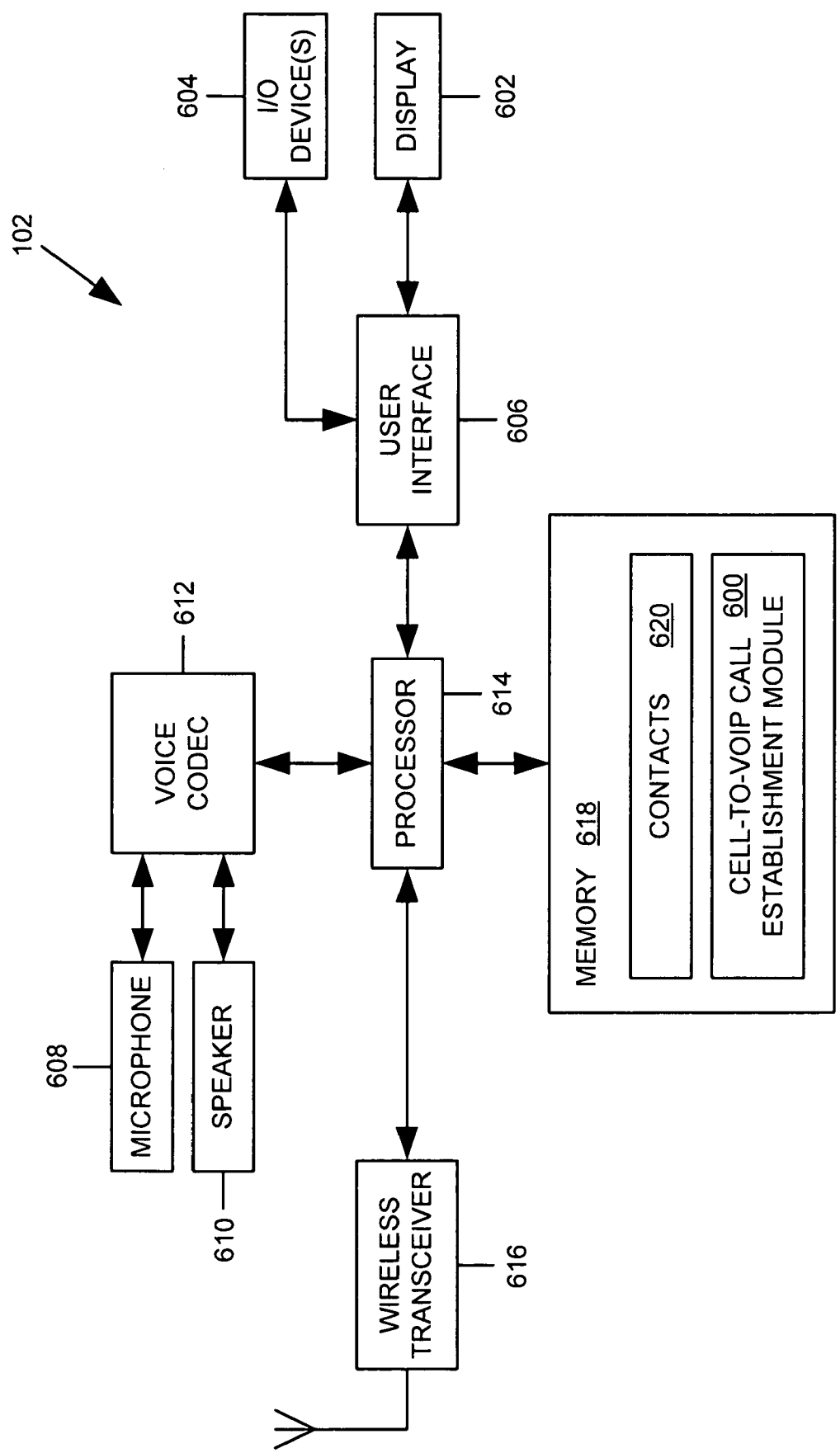
FIG. 6 is a block diagram of an embodiment of the originating mobile communication device of FIG. 1.

The aspects of the cellular-to-VoIP call establishment process that occur at mobile communication device 102 will be described with respect to FIGS. 6-9. In general, mobile communication device 102 is configured to provide 2-way communications using any of a variety of cellular standards (e.g., GSM, CDMA, TDMA, AMPs, etc.) Mobile communication station 102 is further configured with appropriate hardware and/or software subsystems to convert voice signals into IP packets and to implement appropriate standards and protocols for VoIP (and other desirable communication protocols to implement the cellular-to-VoIP call establishment process). As illustrated in FIG. 6, mobile communication device 102 generally comprises a display 602, I/O devices 604, a user interface 606, a microphone 608, a speaker 610, a voice CODEC 612, processor(s) 614 (e.g., digital baseband, analog baseband, etc.), wireless transceiver 616, and memory 618. The operation of these components is not discussed in detail, as they are generally known in the art.

Figure 7:
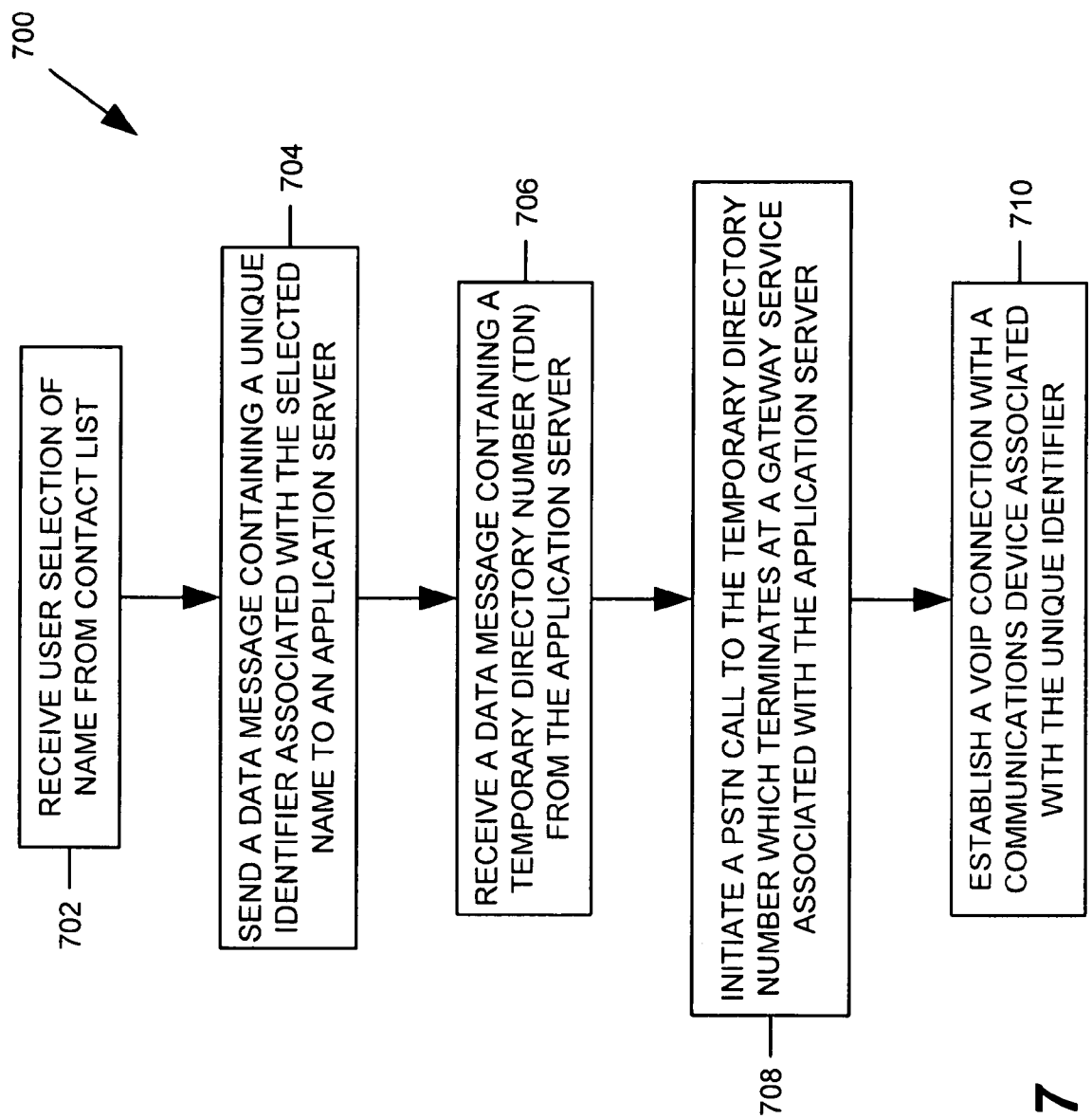
FIG. 7 is a flow chart illustrating the architecture, operation, and/or functionality of an embodiment of the cellular-to-VoIP call establishment module of FIG. 6.

Regarding the unique cellular-to-VoIP call establishment processes, however, it is noted that memory 618 comprises specially-configured logic (i.e., cellular-to-VoIP call establishment module 600) and a list 620 of contacts. Module 600 comprises the logic for implementing the cellular-to-VoIP call establishment process on mobile communication device 102. Although FIG. 6 illustrates a software embodiment, it should be appreciated that, in other embodiments, module 600 may be embodied in hardware, software, firmware, or any combination thereof. FIG. 7 illustrates the architecture, operation, and/or functionality of an embodiment of cellular-to-VoIP call establishment module 600. At block 702, module 600 receives a user selection of a name from list 620. In one embodiment, user interface 606 provides appropriate functionality, via display 602 and I/O devices 604, for enabling a user to select contacts from list 620. The name may be selected via any appropriate I/O device 604 (e.g., via touch screen, keypad, navigation wheel, function keys, buttons, audio commands, etc.).

Referring to the example of FIGS. 8 and 9, user interface 606 may provide a list 620 as a series of names 902. User interface 606 may be presence-enabled, in which case presence information 904 is displayed for names 904, indicating the availability of the particular name. Presence management functions may be implemented using, for example, an extension of session initiation protocol (SIP) called SIP for Instant Messaging and Presence Leveraging (SIMPLE). SIMPLE provides subscriber presence management and instant messaging functions similar to instant messaging services. The presence management functionality may range from simple on/off or available/unavailable status information, or much more elaborate types of information. For example, a subscriber might be available for certain types of sessions—text only if they are in a meeting. The subscriber may only want to accept calls from certain categories of users—friends, family, business, etc. Presence may also indicate geographic location or type of location—at work, at home, in transit, etc.

Names 902 may be defined by the user of mobile communication device 102, by communication system 100, or by the individual identified by the name. Presence information 904 is managed by appropriate software residing on mobile communication device 102 and associated services provided via communication system 100. In the example illustrated in FIG. 9, the user scrolls down list 620 and selects an entry (in this case, Evan, who is identified based on system presence information as being "available"). The user does not need to know that Evan is a VoIP destination. From the user's perspective, "Evan" could be a mobile number, a landline, or a VoIP identity. In certain embodiments, this information may be left intentionally transparent to the user. In this manner, a wireless service provider (or other provider) may provide the cellular-to-VoIP call establishment process as a seamless service which, from the user perspective, functions like an enhanced IP service (e.g., an IMS or converged service).

Referring again to FIG. 7, module 600 may be configured to receive the user selection of the VoIP destination in any suitable manner. At block 704, module 600 generates a data message for delivery to application server 110. It should be appreciated that the data message may be configured to support any suitable protocols. In one embodiment, the protocol between mobile communication device 102 and application server 110 is SIP (session initiation protocol). SIP is a standard of the Internet Engineering Task Force (IETF) for multimedia conferencing over Internet protocol (IP). SIP is an ASCII-based, application-layer control protocol defined in RFC 2543, which is hereby incorporated by reference in its entirety. SIP may be used to establish, maintain, and terminate calls between two more end points. The connection between mobile communication device 102 and application server 110 may support, for example, 1x, GPRS, or other wireless data connections.

Regardless the protocol, message structure or type of data connection, the data message contains information sufficient to identify the VoIP destination. At block 706, module 600 receives a reply message from application server 110, which contains a TDN, as described above. At block 708, module 600 triggers a PSTN call to the TDN. If the VoIP destination is available, at block 710, the PSTN call may be answered and bridged to a connection with VoIP destination device 104.

As mentioned above, the cellular-to-VoIP call establishment process may be implemented using various communication protocols and standards and may be adapted to support various service providers and networks. Various examples are provided below. One exemplary embodiment operates as follows:

A wireless subscriber initiates the process of establishing a call to a VoIP "buddy" by selecting a name from their contact list (name@skype.net) using a client application running on their wireless device.

The client application requests routing instructions from an application server. The protocol used for the request could be an SIP invite method.

The SIP application server validates the VoIP destination and allocates a temporary number based on the location of the originating switch.

The application server returns the assigned temporary number to the client application running on the wireless device. The protocol used for the response could be an SIP redirection response.

The client application causes the wireless device to place a standard TDM call to the returned telephone number.

A media gateway receives the call and routes the SIP signaling associated with the destination phone number (the assigned local temporary number) to the SIP application server.

The original SIP URI destination for the received calling party address is retrieved from application context.

An SIP invite message is sent back to the media gateway with the temporary number replaced with the original destination (name@skype.net).

The media gateway extends the call to the VoIP subscriber via VoIP.

In this embodiment, the usage information may be maintained by the SIP application server and used to create wholesale settlement reports for termination access fees between the participating wireless operators and VoIP service providers.

Figure 10:
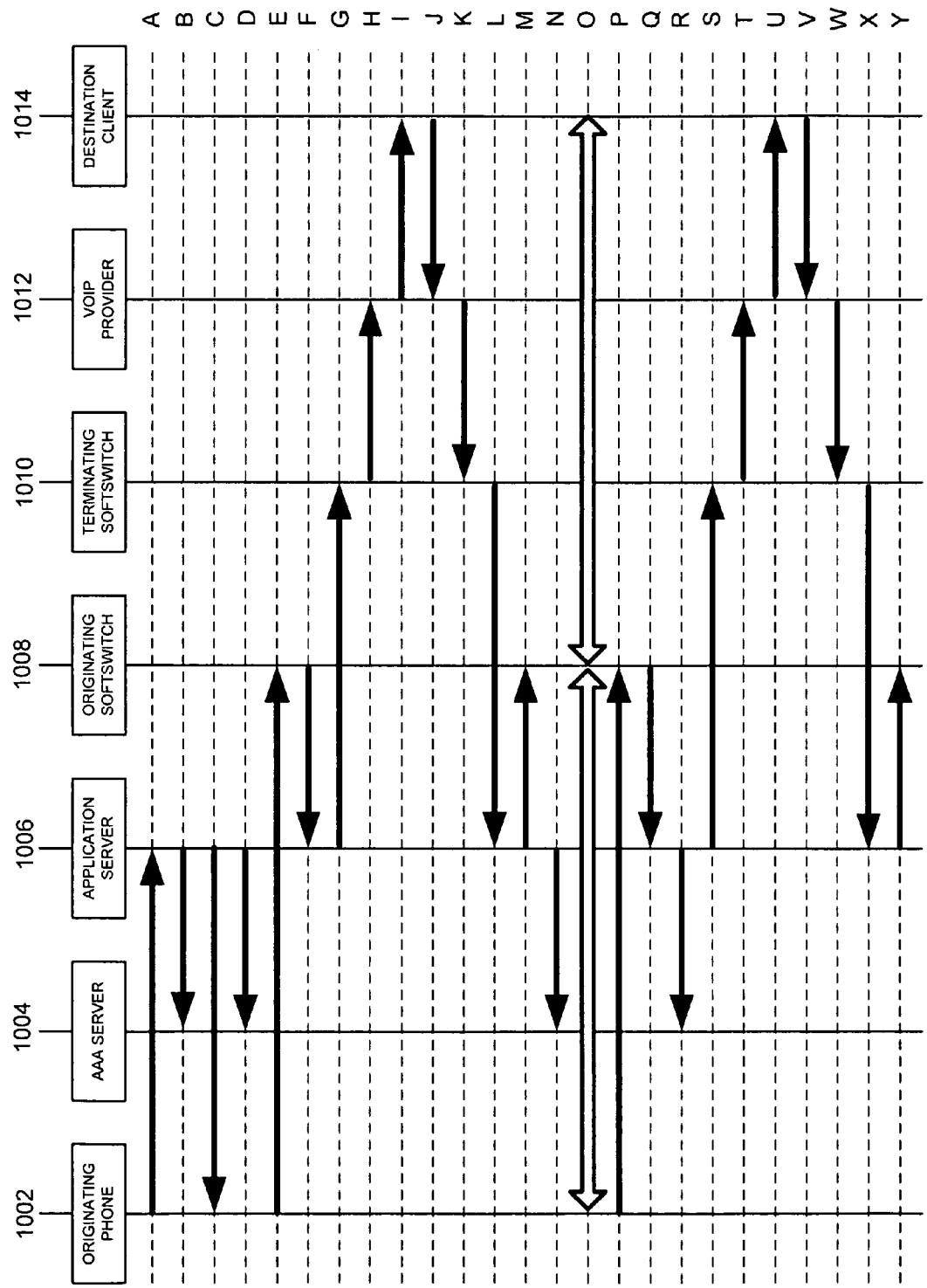
FIG. 10 is a call flow diagram illustrating an embodiment of a method for establishing a session between an originating cellular telephone and a VoIP destination client.

Another exemplary embodiment is illustrated in FIG. 10. In the embodiment of FIG. 10, the cellular-to-VoIP call establishment process occurs across the following system components: an originating cellular phone 1002, an authentication/authorization/accounting (AAA) server 1004, an application server 1006, an originating softswitch 1008, a terminating softswitch 1010, a VoIP provider 1012, and a destination client 1014. The cellular-to-VoIP call establishment process establishes a voice session from originating cellular telephone 1002 to a SIP-based VoIP destination client 1014 using a temporary directory number (TDN). The TDN is assigned to the VoIP destination device for a single call. The reference letters to the right of the call flow diagram of FIG. 10 correspond to the following description.

A. Originating cellular phone 1002 sends a data message using, for example, 1XRTT, WAP, SMS, etc. to an SIP application service (application server 1006). The message contains at least one SIP URI for a VoIP destination (e.g., name@siptalk.com) as well as the MSISDN/MDN of originating cellular phone 1002 (e.g., CgP Number).

B. Accounting for a session invitation for originating cellular telephone 1002 is started.

C. The SIP application service assigns a TDN to this call and returns a data message to originating cellular phone 1002 containing the TDN. SIP application server 1006 marries and stores the TDN, the SIP URI, and the CgP number in context (CTX). A business-rule-defined timer may be set and the client application (on originating cellular phone 1002) configured to await a call to the TDN.

D. Accounting for the session invite for originating cellular phone 1002 is stopped.

E. The subscriber for originating cellular phone 1002 or a handset-resident application reads a data reply from application server 1006 and calls the TDN returned.

F. Because the TDN is associated in the PSTN with the originating soft switch, the call is terminated at originating soft switch 1008. This number may be associated with SIP application server 1006, so a SIP INVITE is sent to the application server:

INVITE sip: +1-813-xxx-xxxx@syniverse.com; npdi=yes@syniverse.com:5060 SIP/2.0

To: sip:name@siptalk.com; tag=fdffabb

From: tel: +1-303-123-xxxx; tag=kdreffa

Call-ID: 12345600

CSeq: 1 INVITE

Content-Type: application/sdp

G. SIP application server 1006 checks the target URI and compares the number there with the list of numbers in CTX. When it finds a match, it functions as a back-to-back user agent (B2BUA) and creates an INVITE sent to terminating soft switch 1010 with the SIP URI and the From header of the CgP number (or an alias URI):

INVITE sip:name@siptalk.com; SIP/2.0

To: sip:name@siptalk.com; tag=fdffabb

From: tel: +1-3-3-123-xxxx; tag=kdreffa

Call-ID: 12345600

CSeq: 1 INVITE

Record-Route: <sip:s1.syniverse.com; lr>

Content-Type: application/sdp

H. The SIP INVITE is routed to the appropriate destination (e.g., via DNS look-up, etc.)

I. The SIP INVITE is routed to the appropriate destination (e.g., via DNS look-up, etc.)

J. The SIP INVITE is acknowledged via 200 OK method.

K. The SIP INVITE is acknowledged via 200 OK method.

L. The SIP INVITE is acknowledged via 200 OK method.

M. The SIP INVITE is acknowledged via 200 OK method.

N. Account for the VoIP media session is started.

O. Originating soft switch 1008 bridges the inbound PSTN call leg with the RTP stream defined by the SIP messaging.

P. The originating mobile phone subscriber or the application ends the PSTN call.

Q. The SIP BYE is routed to the appropriate destination.

R. Accounting for the VoIP media session is stopped.

S. The SIP BYE is routed to the appropriate destination.

T. The SIP BYE is routed to the appropriate destination.

U. The SIP BYE is routed to the appropriate destination.

V. The SIP BYE is acknowledged via 200 OK method.

W. The SIP BYE is acknowledged via 200 OK method.

X. The SIP BYE is acknowledged via 200 OK method.

Y. The SIP BYE is acknowledged via 200 OK method.

Figure 11:
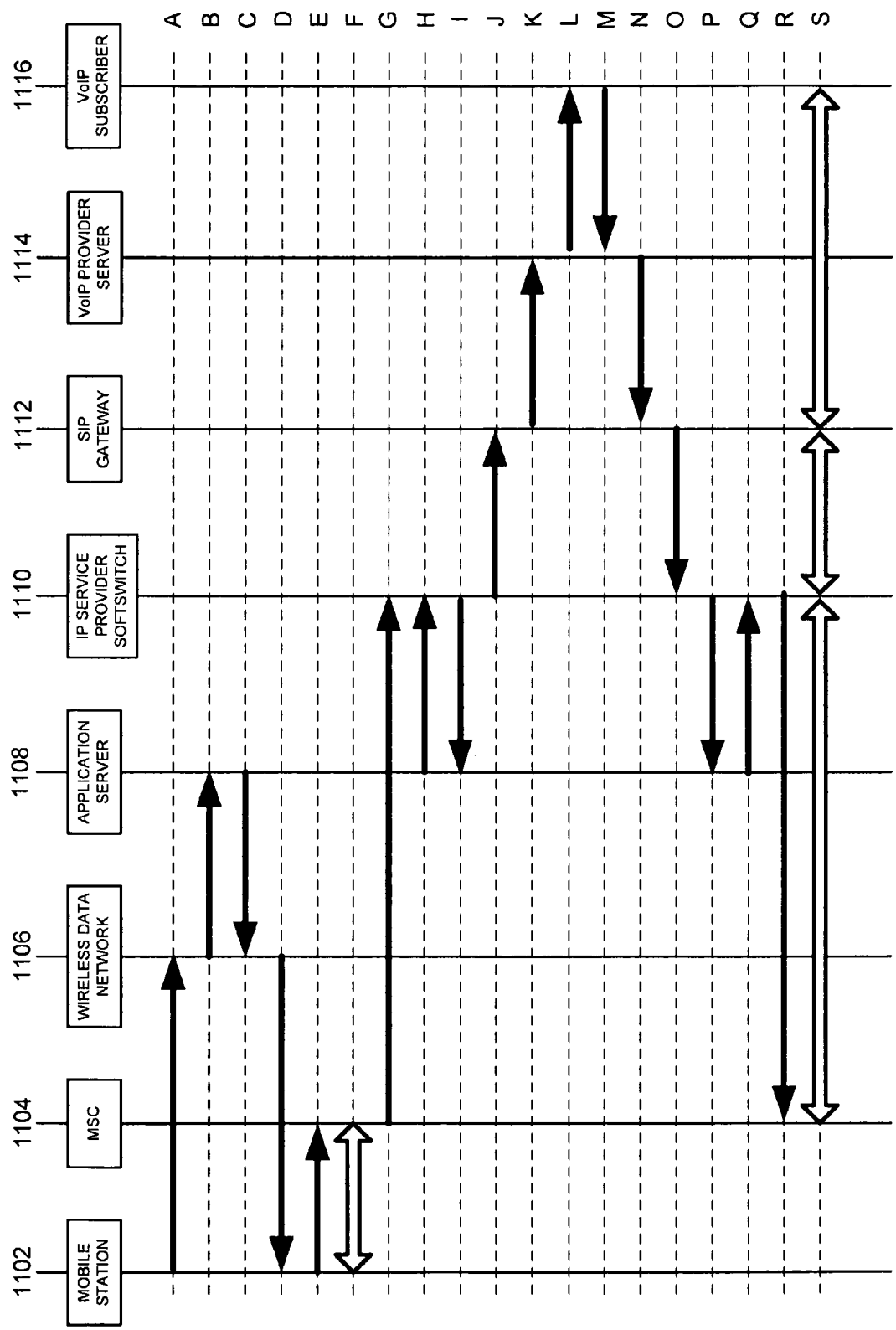
FIG. 11 is a call flow diagram illustrating another embodiment of a method for establishing a session between an origination mobile station and a VoIP subscriber.

FIG. 11 illustrates another embodiment of a cellular-to-VoIP call establishment process, which occurs across the following system components: a mobile station 1102, a mobile switching center 1104, a wireless data network 1106, an application server 1108, an IP service provider softswitch 1110, an SIP gateway 1112, a VoIP service provider 1114, and a VoIP subscriber 1116. The reference letters to the right of the call flow diagram of FIG. 11 correspond to the following description.

A. A user or subscriber selects a name from an address book or contacts list presented by the client application on mobile station 1102 (e.g., a BREW/Java application) and presses SEND. The MS application connects to the operator's wireless IP network (e.g., wireless data network 1106) and sends appropriate information to SIP Application server 1108).

B. The wireless operator's IP network element forwards the IP packets to SIP application server 1108.

C. SIP application server 1108 responds to the IP query with, for example, a VoIP network provider E.164 number based on the information received in the query, and returns the information. SIP application server 1108 stores all relevant information regarding the query/response data in context (memory).

D. The wireless operator's IP network element routes the response to mobile station 1102.

E. The client application retrieves the VoIP network provider E.164 number and places a traditional wireless telephony call to the E.164 number.

F. The voice channel is assigned to mobile station 1102.

G. MSC 1104 launches an IAM based on its routing tables to the VoIP network provider softswitch (e.g., IP service provider softswitch 1110).

H. the VoIP network provider softswitch has the E.164 number associated with SIP application server 1108 and routes the signaling to the EPS for SIP INVITE delivery.

I. SIP application server 1108 receives the INVITE and retrieves the context information based on the E.164 number. It extracts the address that mobile station 1102 sent, as well as the mobile station calling number, adds a Record-Route header and formulates an INVITE; TO: the named address and FROM: the MS E.164.

J. the VoIP network provider EPS receives and processes the INVITE. Application server 1108 or the IP service provider infrastructure may perform DNS name resolution and send an IP address. The VoIP network provider EPS routes the signaling to SIP Gateway 1112 (e.g., a gateway associated with a VoIP provider, such as Skype, etc.).

K. SIP gateway 1112 delivers signaling to VoIP provider server 1114 associated with the VoIP subscriber.

L. VoIP provider server 1114 delivers signaling to their VoIP subscriber.

M. VoIP subscriber client acknowledges the invoke and returns information regarding the method of connection.

N. VoIP provider server 1114 acknowledges the invoke and forwards information regarding the method of connection.

O. SIP gateway 1112 responds with a 200 OK message with the SDP connection information.

P. The VoIP network provider EPS responds with a 200 OK message with the SDP connection information.

Q. SIP application server 1108 responds with a 200 OK message with the SDP connection information.

R. The VoIP network provider softswitch responds to the IAM with an ANM message.

S. End-to-end MS voice channel, TDM circuit voice channel, RTP voice session and VoIP proprietary voice session connected and stable.

It should be appreciated that SIP routing towards the VoIP provider through the IP service provider may be configured to support the particular addressing scheme employed by the VoIP provider. In this example, SIP gateway 1112 performs appropriate mapping of the E.164 telephone number to the VoIP-specific addressing scheme. Furthermore, SIP application server 1108 may be configured to add a record-Route header to the outbound INVITE. This may facilitate CDR-type logging output and enable clearing and settlement between the providers.

Figure 12:
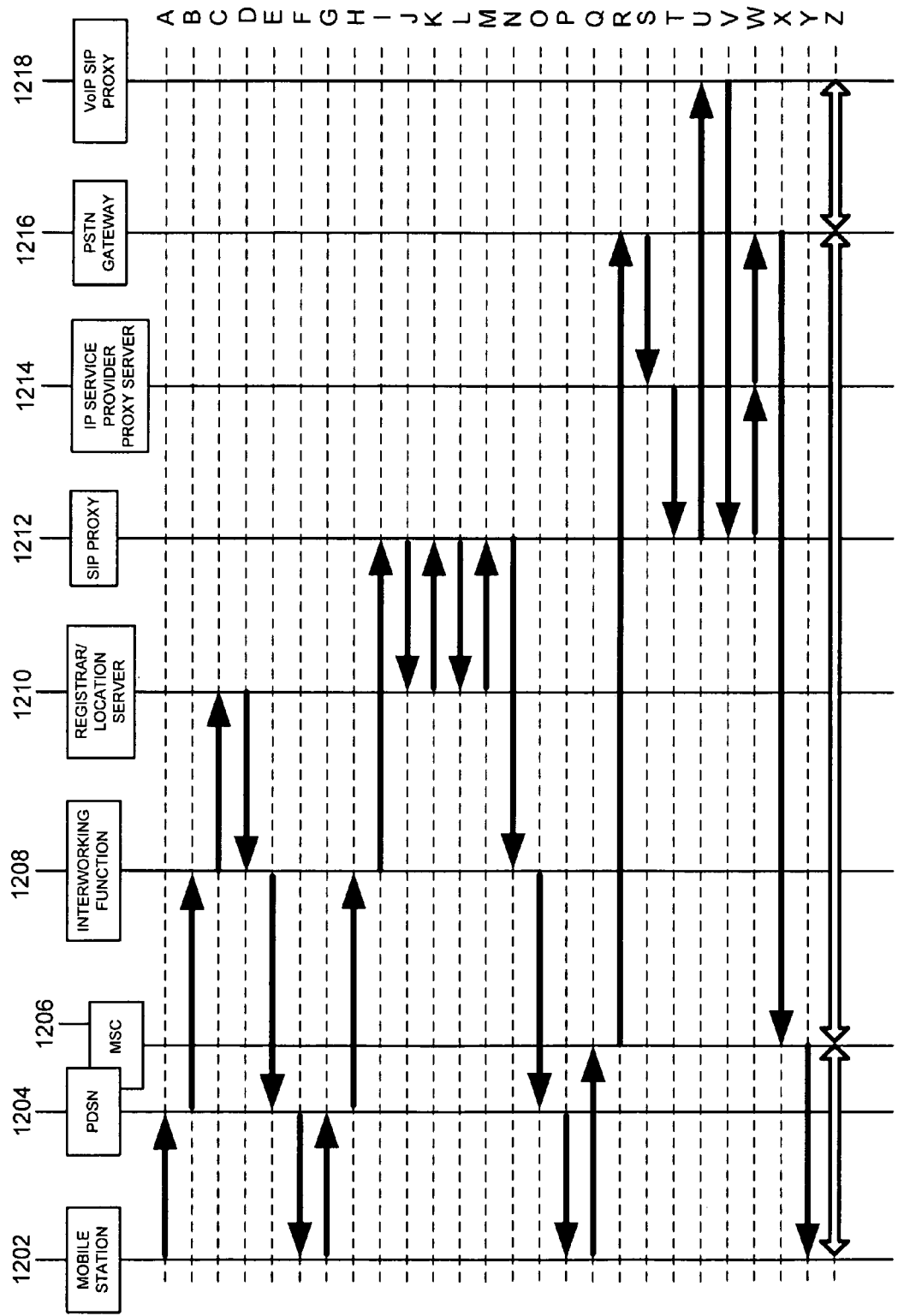
FIG. 12 is a call flow diagram illustrating another embodiment of a method for establishing a session between an originating mobile communication device and a peer-to-peer VoIP user.

FIG. 12 illustrates yet another embodiment of a cellular-to-VoIP call establishment process, which occurs across the following system components: a mobile station 1202, PDSN 1204, a mobile switching center 1206, an internetworking function 1208, a registrar/location server 1210, an SIP proxy 1212, an IP service provider proxy server 1214, a PSTN gateway 1216, and a VoIP SIP proxy. In this example, it assumed that a client application resides on mobile station 1202 for enabling the user to select a party to call by name (e.g., voip@prov.com). The application is configured such that requests arrive at the IP address of internetworking function (IWF) 1208. The user@domain (or realm) passed by mobile station 1202 to identify itself as registered is a domain that the Registrar is authoritative for or which it can proxy. The reference letters to the right of the call flow diagram of FIG. 12 correspond to the following description. It call flow assumes a CDMA handset. If the handset was GSM, the MDN=MSISDN, the MIN=IMSI, and the SID and ESN would be null. All TDNs are routed to a partner network in the PSTN. Provisional SIP responses (numbered 1xx) have been omitted for brevity. Authentication of the user is not shown, although there are various ways to accomplish this.

A. Mobile station 1202 registers with registrar/location server 1210 through PDSN/SGSN (e.g., PDSN 1204). This occurs on application start and reoccurs every "Expires" (see c. below) seconds. Data sent in registrations includes:
TransactionType: REG
Registration Domain: =syniverse.com
SIP uri: name@syniverse.com
MDN
MIN
ESN
SID B. IP Packet is transported to IWF 1208.

C. IWF 1208 translates the packet into the SIP (RFC3261) protocol as a SIP REGISTER method and sends it to registrar/location server 1210:
REGISTER sip:syniverse.com SIP/2.0
From: <IWF@syniverse.com>;tag=2696193006
To: <name@syniverse.com>
Contact: "MDN.MIN.ESN.SID"<tel: MDN@Syniverse.com:5060>
Call-ID: E141452EB7CC4164A30703E5BBE9EA52@synverse.com
CSeq: 62650 REGISTER
Expires: 3600
Max-Forwards: 70
User-Agent: IWF-Syn
Content-Length: 0

D. SIP registrar/location server 1210 receives the REGISTER and parses the information appropriately. It stores the MDN, MIN, ESN, SID and address of record from the To: header into the Location data store. Server 1210 responds to IWF 1208 with a 200 OK SIP response method.

E. IWF 1208 forwards an empty response signifying an ACK to mobile station 1202.

F. PDSN 1204 forwards ACK to mobile station 1202.

G. The user of mobile station 1202 selects, via a calling application, an address to call, in this example, voip@prov.com and presses Enter, or Select, etc. within the application. The application builds an ORIG transaction type with the following information and sends it to SIP Proxy 1212 via the PDSN/SGSN:
TransactionType: ORIG
CdP uri: voip@prov.com
SIP uri: name@syniverse.com
MDN
MIN
ESN
SID H. IP Packet is transported to IWF 1208.

I. IWF 1208 recognizes by transaction type=ORIG that the data needs to be translated to a SIP INVITE method and forwarded on SIP Proxy 1212:
INVITE sip: voip@prov.com SIP/2.0
From: <name@syniverse.com>;tag=4112001205
To: <sip: voip@prov.com>
Contact: <sip:MDN@Syniverse.com:5060>
Call-ID: C0B5EAC5-46C7-49A5-A3D3-A02309385A71@syinverse.com
CSeq: 4458 INVITE
Max-Forwards: 70
User-Agent: IWF-Syn
Content-Length: 0

J. SIP proxy 1212 queries registrar/location server 1210 for the called party name using a SIP REGISTER method with no contact header. This is done to ensure that the called party is not registered with this service already (if it were, the MDN would be returned and be done with the call).

K. In this example the called party is not registered with this service therefore, a 404 Not Found response is returned.

L. SIP proxy 1212 then queries the registrar/location server 1210 for the calling party name using a SIP REGISTER method with no contact header. This is done to retrieve the TDN associated with this user.

M. Because this user is registered with this service, registrar/location server 1210 takes the previously stored SID portion of the "name" field and queries an internal SID to TDN table to retrieve the appropriate local TDN. Registrar/location server 1210 will create a Contact header on the fly and return all contacts associated with the user to SIP proxy 1212.

N. SIP Proxy 1212 selects the Contact Header that has "tdn" in the domain and formulates a 302-redirect response using the TDN and sends it to IWF 1208. SIP proxy 1212 stores context related to this call by MDN O. IP packet is transported to mobile station 1202 with TDN in it.

P. PDSN 1204 forwards packet to mobile station 1202.

Q. Application resident on mobile station 1202 receives the response with TDN and by controlling the phone originates a call to the TDN using traditional telephony.

R. MSC 1206 sends ISUP IAM to destination switch in partner network.

S. A partner network media gateway (e.g., PSTN gateway 1216) has an a priori arrangement to route calls destined to TDN to SIP proxy server 1212 through a partner network Edge Proxy Server (e.g., proxy server 1214).

T. EPS routes INVITE to SIP proxy 1212.

U. SIP proxy 1212 receives INVITE to TDN, restores context and retrieves the Request URI from the stored data. SIP proxy 1212 performs a DNS name resolution query, creates an INVITE with the same Call-ID as retrieved call and sends it to destination address via IP to the appropriate domain, in this example, prov.com.

V. 200 OK response(s) are transmitted through network signifying call setup can proceed.

W. 200 OK response(s) are transmitted through network signifying call setup can proceed.

X. The partner network media gateway returns the ISUP Answer message (ANM) to the originating MSC.

Y. MSC 1206 brings mobile station 1202 up on voice channel.

Z. Call is connected end-to-end.

Figure 13:
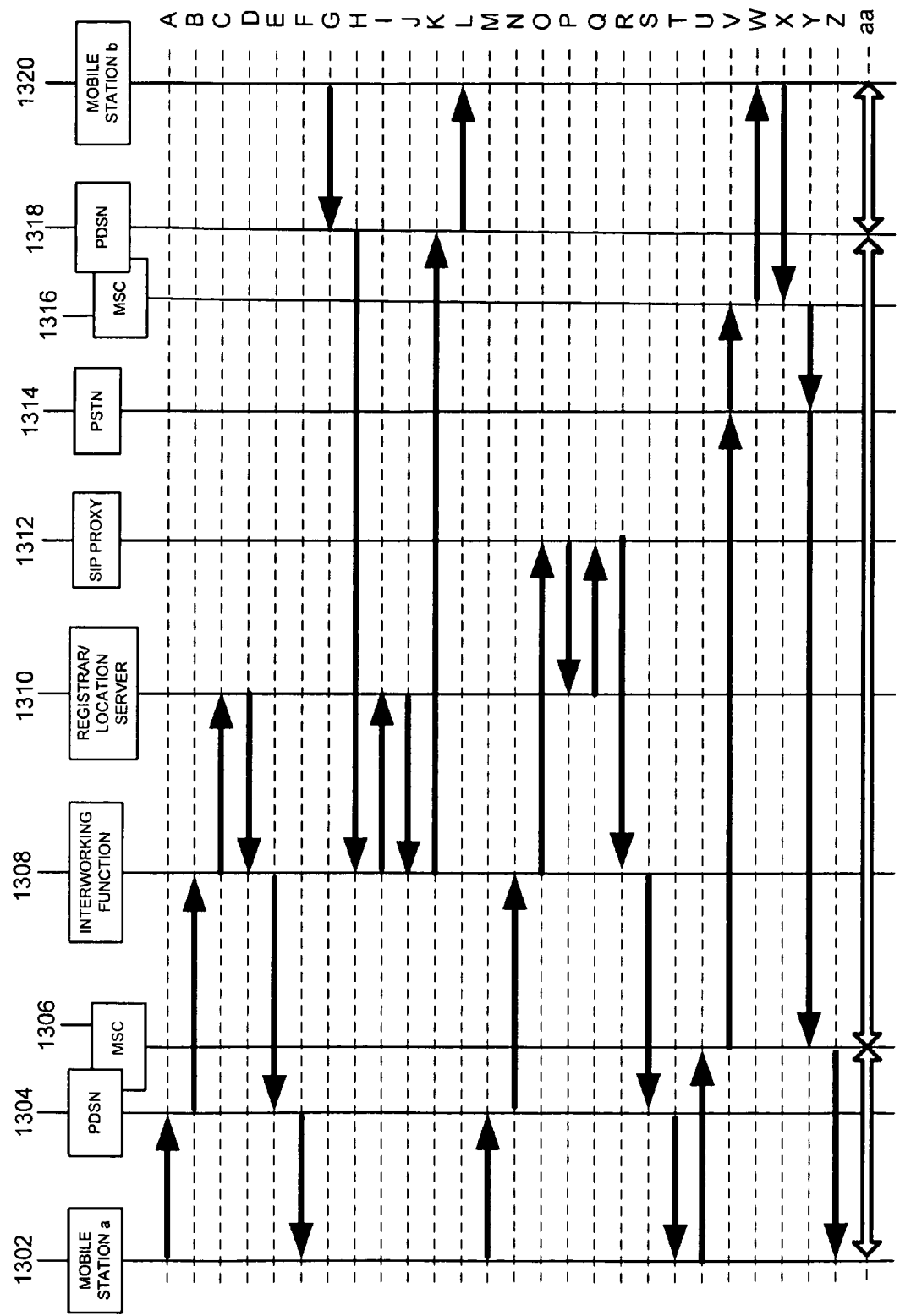
FIG. 13 is a call flow diagram illustrating an embodiment of a method for establishing a session between an originating mobile communication device and a destination mobile communication device.

FIG. 13 illustrates a further embodiment of a cellular-to-VoIP call establishment process between two mobile stations. In this embodiment the cellular-to-VoIP call establishment process occurs across the following system components: a mobile station A 1302 (originating device), a PDSN 1304, an MSC 1306, an IWF 1308, a registrar/location server 1310, an SIP proxy 1312, PSTN 1312, MSC 1316, PDSN 1318, and a mobile station B 1320 (terminating device). The reference letters to the right of the call flow diagram of FIG. 13 correspond to the following description.

A. Mobile station A 1302 registers with registrar/location server 1310 through PDSN/SGSN (e.g., PDSN 1304). This occurs on application start and reoccurs every "Expires" (see c. below) seconds. Data sent in registrations includes:
TransactionType: REG
Registration Domain: =syniverse.com
SIP uri: name@syniverse.com
MDN
MIN
ESN
SID B. IP Packet is transported to IWF 1308

C. IWF 1308 translates the packet into the SIP (RFC3261) protocol as a SIP REGISTER method and sends it to the Registrar/Location Server 1310:
REGISTER sip:syniverse.com SIP/2.0
From: <IWF@syniverse.com>;tag=2696193006
To: <name@syniverse.com>
Contact: "MDN.MIN.ESN.SID"<tel: MDN@Syniverse.com:5060>
Call-ID: E141452EB7CC4164A30703E5BBE9EA52@synverse.com
CSeq: 62650 REGISTER
Expires: 3600
Max-Forwards: 70
User-Agent: IWF-Syn
Content-Length: 0

D. SIP registrar/location server 1310 receives the REGISTER and parses the information appropriately. It stores the MDN, MIN, ESN, SID and address of record from the To: header into the Location data store. Registrar/location server 1310 responds to IWF 1308 with a 200 OK SIP response method.

E. IWF 1308 forwards an empty response signifying an ACK to mobile station A 1302.

F. PDSN 1304 forwards ACK to mobile station A 1302

G. Mobile station B 1320 registers with registrar/location server 1320 through PDSN/SGSN (e.g., PDSN 1318).

H. IP packet is transported to IWF 1308.

I. IWF 1308 translates the packet into the SIP (RFC3261) protocol as a SIP REGISTER method and sends it to registrar/location server 1310:
REGISTER sip:syniverse.com SIP/2.0
From: <IWF@syniverse.com>;tag=2696193006
To: <MSb@syniverse.com>
Contact: "MDN.MIN.ESN.SID"<tel: MDN@Syniverse.com:5060>
Call-ID: E141452EB7CC4164A30703E5BBE9EA54@synverse.com
CSeq: 62660 REGISTER
Expires: 3600
Max-Forwards: 70
User-Agent: IWF-Syn
Content-Length: 0

J. Registrar/location server 1310 receives the REGISTER and parses the information appropriately. It stores the MDN, MIN, ESN, SID and address of record from the To: header into the Location data store. The Registrar responds to IWF 1308 with a 200 OK SIP response method.

K. IWF 1308 forwards an empty response signifying an ACK to mobile station B 1320.

L. PDSN 1318 forwards ACK to mobile station B 1320.

M. The user of mobile station A 1302 selects (with the calling application) an address to call, in this example, MSb@prov.com and presses Enter, or Select, etc. within the application. The application builds an ORIG transaction type with the following information and sends it to SIP proxy 1312 via the PDSN/SGSN:
TransactionType: ORIG
CdP uri: MSb@prov.com
SIP uri: name@syniverse.com
MDN
MIN
ESN
SID N. IP Packet is transported to IWF 1308

O. IWF 1308 recognizes by transaction type=ORIG that the data needs to be translated to a SIP INVITE method and forwarded on SIP proxy 1312:
INVITE sip: MSb@prov.com SIP/2.0
From: <name@syniverse.com>;tag=4112001215
To: <sip: MSb@prov.com>
Contact: <sip:MDN@Syniverse.com:5060>
Call-ID: C0B5EAC5-46C7-49A5-A3D3-A02309385B56@syinverse.com
CSeq: 4488 INVITE
Max-Forwards: 70
User-Agent: IWF-Syn
Content-Length: 0

P. SIP proxy 1312 queries registrar/location server 1310 for the called party name using a SIP REGISTER method with no contact header. This is done to determine if the called party is registered with this service already.

Q. In this example the called party is registered with this service and, therefore, the MDN of the Called Party (mobile station B 1320) is returned as a Contact header in the response.

R. SIP proxy 1312 selects the Contact Header that has "mdn" in the domain and formulates a 302-redirect response using the MDN and sends it to the IWF. SIP proxy 1312 stores context related to this call by MDN.

S. IP packet is transported to mobile station A 1302 with MDN in it.

T. PDSN 1304 forwards packet to mobile station A 1302.

U. Application resident on mobile station A 1302 receives the response with MDN and by controlling the phone originates a call to the MDN using traditional telephony.

V. MSC 1306 sends ISUP IAM to destination switch in PSTN 1314.
W. MSC 1316 serving mobile station B 1320 pages the mobile.
X. Mobile station B 1320 answers the page.
Y. ISUP ANM is passed through PSTN 1314 to originating MSC 1306
Z. MSC 1306 brings mobile station A 1302 up on voice channel.
aa. Call is connected end-to-end through PSTN 1314.

It should be appreciated that the cellular-to-VoIP call establishment processes described above may be leveraged using various novel business models. In most existing cellular-to-VoIP solutions, the VoIP providers use a bill-and-keep business model for peering between providers, while most wireless operators pay transit and termination access fees to the LEC. In certain aspects, the cellular-to-VoIP call establishment process may be implemented to leverage an IP network service (e.g., a VoIP network provider's Transit service) as a cost-effective solution for LEC-bypass and introduce a termination fee payable by the wireless operator to the VoIP provider for allowing access to their subscribers and for sharing presence information. This model may introduce a new revenue stream for the VoIP providers and may be closer to what wireless operators are going to expect when the VoIP provider wants to terminate traffic on their network.

The wireless operators may be willing to pay the VoIP termination fee because it will be far less than the alternative, which is to pay LEC transit fees to terminate calls to a normal PSTN number for those VoIP subscribers that opt for in-bound calling services. To call a VoIP subscriber today from a standard cell phone requires the VoIP subscriber to purchase additional services from their VoIP service provider that include one or more standard telephone numbers and the ability to receive in-coming calls from the PSTN. When a wireless subscriber calls one of these numbers, the wireless operator normally pays a transit fee to the LEC or the IXC to carry the voice traffic to another network.

Wireless operators and VoIP service providers may perceive significant business value from the cellular-to-VoIP call establishment processes described above. For example, cellular-to-VoIP call establishment processes may offer the following value propositions to wireless operators:

Enable cellular subscribers to send and receive calls to worldwide VoIP subscribers using their subscriber name (URI) and without the VoIP subscriber requiring a dedicated phone number Provide a presence-enabled, "next generation" user interface prior to true end-to-end VoIP availability in the wireless network Enable bundling of a branded VoIP soft-client with their in-network calling programs to drive additional value and reduce network radio resources associated with unlimited in-network rate plans The presence-enabled user interface can also be used for mobile-to-mobile presence information if both subscribers are running the VoIP calling user interface application.

By bundling VoIP calling with in-network rate plans, the wireless operator can increase the take-rate for in-network subscriptions, which will increase their revenue.

While today's phone numbers are portable, leading to possible increased churn, SIP URIs are tied to a particular domain (sip:name@VzW.net). If the wireless operator were to bundle their own softphone and "branded" user id, this could provide increased stickiness similar to how e-mail addresses tie subscribers to particular ISPs.

The cellular-to-VoIP call establishment processes may offer the following value propositions to VoIP service providers:

Introduce a new revenue stream through termination access fees charged to transit providers for call terminations to their subscribers that use "free" PC-to-PC calling agents Increase reach and usage of VoIP service and drive additional demand for other chargeable services such as PSTN voice terminations Possibility to offer a special kind of voice termination service to terminate to participating wireless operators for substantially less than traditional PSTN voice termination charges Possibility to build partnerships with wireless operators or MVNOs for branded user agents running on wireless devices.

The cellular-to-VoIP call establishment processes offer the following additional opportunities to other services providers, such as IP exchange service providers:

Leverage VoIP calling as a foundation for other VoIP services such as PSTN by-pass, VoIP peering, and IP access to SS7 databases, etc.

Leverage VoIP calling to establish business relationships with VoIP service providers and identify other business opportunities within their market segment Opportunity for shorter-term TDM-based wireless-to-VoIP peering and longer-term VoIP peering marketplace Although this disclosure describes the invention in terms of exemplary embodiments, the invention is not limited to those embodiments. Rather, a person skilled in the art will construe the appended claims broadly, to include other variants and embodiments of the invention, which those skilled in the art may make or use without departing from the scope and range of equivalents of the invention.

What is claimed is:

1. A method for establishing a session between an originating mobile communication device and a VoIP destination device, the method comprising:

receiving a first data message from an originating mobile communication device while the originating mobile communication device is not engaged in a current voice call with a VoIP destination device, the first data message comprising information identifying the VoIP destination device;

in response to receiving the first data message, sending a second data message to the originating mobile communication device, the second data message comprising information identifying a temporary directory number (TDN) associated with the VoIP destination device;

the originating mobile communication device initiating an initial incoming voice call to the TDN;

receiving the initial incoming voice call to the TDN from the originating mobile communication device;

in response to receiving the initial incoming voice call, establishing a media session between the originating mobile communication device and the VoIP destination device; and bridging the initial incoming voice call with the media session.

2. The method of claim 1, wherein the receiving the first data message comprises receiving a session initiation protocol (SIP) uniform resource indicator (URI) associated with the VoIP destination device.

3. The method of claim 1, further comprising validating the VoIP destination device, in response to receiving the first data message.

4. The method of claim 3, further comprising allocating the TDN based on a location of an originating switch.

5. The method of claim 1, wherein the establishing the media session between the originating mobile communication device and the VoIP destination device involves a session initiation protocol (SIP).

6. The method of claim 1, wherein the establishing the media session between the originating mobile communication device and the VoIP destination device comprises bridging the initial incoming voice call with the originating mobile communication device to a VoIP media session with the VoIP destination device.

7. The method of claim 1, wherein the establishing the media session between the originating mobile communication device and the VoIP destination device and bridging the initial incoming voice call with the media session comprises:

sending an invite message to the VoIP destination device;

answering the incoming voice call;

receiving an accept reply from the VoIP destination device; and sending a ringing indication to the originating mobile communication device.

8. A method for establishing a VoIP media session between an originating cellular telephone and a VoIP destination device, the method comprising:

an originating cellular telephone initiating a call establishment process with a VoIP destination device, while there is not a current voice call with the VoIP destination device, by sending a first data message to an application server, the first data message comprising an identifier associated with the VoIP destination device;

the application server receiving the first data message;

the application server sending a second data message to the originating cellular telephone, the second data message comprising information identifying a temporary directory number (TDN) associated with the VoIP destination device;

the originating cellular telephone initiating an initial incoming voice call to the TDN;

a gateway detecting the initial incoming voice call to the TDN from the originating cellular telephone;

sending an invite message to the identifier associated with the VoIP destination device;

sending a ringing indication to the originating cellular telephone;

receiving an accept reply from the VoIP destination device;

answering the initial incoming voice call from the originating cellular telephone and establishing a VoIP media session between the originating cellular telephone and the VoIP destination device; and bridging the initial incoming voice call with the VoIP media session.

9. The method of claim 8, wherein the receiving the first data message comprises receiving a SIP URI associated with the VoIP destination device.

10. The method of claim 8, wherein the first data message comprises one of a 1XRTT message, a WAP message, and an SMS message.

11. The method of claim 8, wherein the detecting the initial incoming voice call comprises:

routing the signaling associated with the TDN to the application server; and retrieving the identifier associated with the VoIP destination.

* * * * *